(12) United States Patent
Dorffer et al.

(10) Patent No.: US 8,944,162 B2
(45) Date of Patent: Feb. 3, 2015

(54) AMBIENT-ACTIVATED SWITCH FOR DOWNHOLE OPERATIONS

(75) Inventors: Daniel F. Dorffer, Houston, TX (US); Donald L. Crawford, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 652 days.

(21) Appl. No.: 12/520,957

(22) PCT Filed: Sep. 18, 2007

(86) PCT No.: PCT/US2007/020225
§ 371 (c)(1),
(2), (4) Date: Jul. 23, 2009

(87) PCT Pub. No.: WO2009/038554
PCT Pub. Date: Mar. 26, 2009

(65) Prior Publication Data
US 2010/0059283 A1 Mar. 11, 2010

(51) Int. Cl.
*E21B 47/00* (2012.01)
*H01H 35/00* (2006.01)

(52) U.S. Cl.
CPC ................... *E21B 47/00* (2013.01)
USPC ........... 166/250.01; 166/66; 175/41; 307/117

(58) Field of Classification Search
USPC ............... 166/250.01, 250.12, 66; 73/152.03; 307/116, 117, 118, 119; 175/40, 41
See application file for complete search history.

(56) References Cited

U.S. PATENT DOCUMENTS

| | | | | |
|---|---|---|---|---|
| 4,912,609 A | * | 3/1990 | Gillette | 362/147 |
| 5,445,228 A | | 8/1995 | Rathmell et al. | |
| 5,571,986 A | * | 11/1996 | Snider et al. | 102/275.11 |
| 6,053,111 A | * | 4/2000 | Motley | 102/313 |
| 6,850,068 B2 | * | 2/2005 | Chemali et al. | 324/369 |
| 7,624,681 B2 | * | 12/2009 | Goodman et al. | 102/310 |
| 7,767,919 B2 | * | 8/2010 | Zusman | 200/61.45 R |
| 2004/0020646 A1 | | 2/2004 | Flecker et al. | |
| 2008/0257546 A1 | * | 10/2008 | Cresswell et al. | 166/250.15 |

FOREIGN PATENT DOCUMENTS

| | | |
|---|---|---|
| WO | WO-0065198 A1 | 11/2000 |
| WO | WO-2009038554 A1 | 3/2009 |

OTHER PUBLICATIONS

"International Application Serial No. PCT/US2007/020225, International Search Report mailed May 21, 2008", P220, 11 pgs.

* cited by examiner

*Primary Examiner* — Robert E Fuller
(74) *Attorney, Agent, or Firm* — Schwegman Lundberg & Woessner, P.A.; Anthony Iannitelli

(57) ABSTRACT

An apparatus includes a radiation source to output radiation after power is supplied. The apparatus also includes a power source to supply power. The apparatus includes an ambient-activated switch electrically coupled between the radiation source and the power source. The ambient-activated switch is to switch to an open position while a value for an ambient characteristic for the ambient-activated switch is at an ambient level for a surface of the Earth. The ambient-activated switch is to switch to a closed position while the value for the ambient characteristic for the ambient-activated switch is at a downhole ambient level, wherein the ambient-activated switch is to electrically couple the power source to the radiation source while in the closed position.

29 Claims, 8 Drawing Sheets

AMBIENT-ACTIVATED SWITCH FOR DOWNHOLE OPERATIONS

RELATED APPLICATIONS

This application is a nationalization under 35 U.S.C. 371 of PCT/U.S.2007/020225, filed Sep. 18, 2007 and published as WO 2009/038554 A1, on Mar. 26, 2009; which application and publication are incorporated herein by reference and made a part hereof.

TECHNICAL FIELD

The application relates generally to downhole operations. In particular, the application relates to a ambient-activated switch for controlling components downhole.

BACKGROUND

During drilling operations, determining characteristics (such as the porosity) of the subsurface formation enables the locating and extracting of hydrocarbons to be more efficient and more profitable. One technique to determine these characteristics is to use radiation sources (such as pulsed neutron generators) downhole. The radiation sources output radiation into the subsurface formation. The resulting energy spectrum is monitored to determine the characteristics of the formation. The operation of these radiation sources in the presence of personnel can adversely affect the health of such personnel. Accordingly, a number of safety regulations for drilling operations require that such tools not be operational within a given distance of personnel.

BRIEF DESCRIPTION OF THE DRAWINGS

Embodiments of the invention may be best understood by referring to the following description and accompanying drawings which illustrate such embodiments. In the drawings.

DETAILED DESCRIPTION

Methods, apparatus and systems for ambient-activated switch(es) for downhole operations are described. In the following description, numerous specific details are set forth. However, it is understood that embodiments of the invention may be practiced without these specific details. In other instances, well-known circuits, structures and techniques have not been shown in detail in order not to obscure the understanding of this description.

Some embodiments include a radiation source that is operational downhole to radiate the formation. Such radiation is used to determine various characteristics of the formation. The radiation source can include a pulsed neutron generator, an x-ray sources, etc. Some embodiments include an ambient-activated switch coupled to supply power from a power source to the radiation source. The switch may be activated based on one or more ambient characteristics. For example, the switch may activate based on temperature, pressure, light, vibration, etc. Accordingly, the switch may be one or a combination of a thermal switch, a pressure switch, an optical switch, a vibratory switch, etc. For example, the thermal switch may switch to a position to supply the power to the radiation source after a given temperature or temperature range is reached. The thermal switch may switch after a given downhole temperature is reached. Alternatively or in addition, the switch may be a pressure switch that switches to a position to supply the power to the radiation source after a given pressure or pressure range is reached. Alternatively or in addition, the switch may be an optical switch that switches to a position to supply power to the radiation source after the amount of light is below a given level. Alternatively or in addition, the switch may be a vibratory switch that switches to a position to supply power to the radiation source after the amount of vibration is above a given level. Accordingly, the radiation source may only become operational downhole and not at the surface. Some embodiments may be used in different modes of conveyance including electric line, slickline, pipe conveyed logging or Logging While Drilling (LWD), robot conveyance, etc. Example system configurations are described below.

This description of the embodiments is divided into three sections. The first section describes wellsite operating environments. The second section describes different configurations for controlling operations of a radiation source using an ambient-activated switch. The third section provides some general comments.

Wellsite Operating Environments

Wellsite operating environments, according to some embodiments, are now described.

Figure 1A:
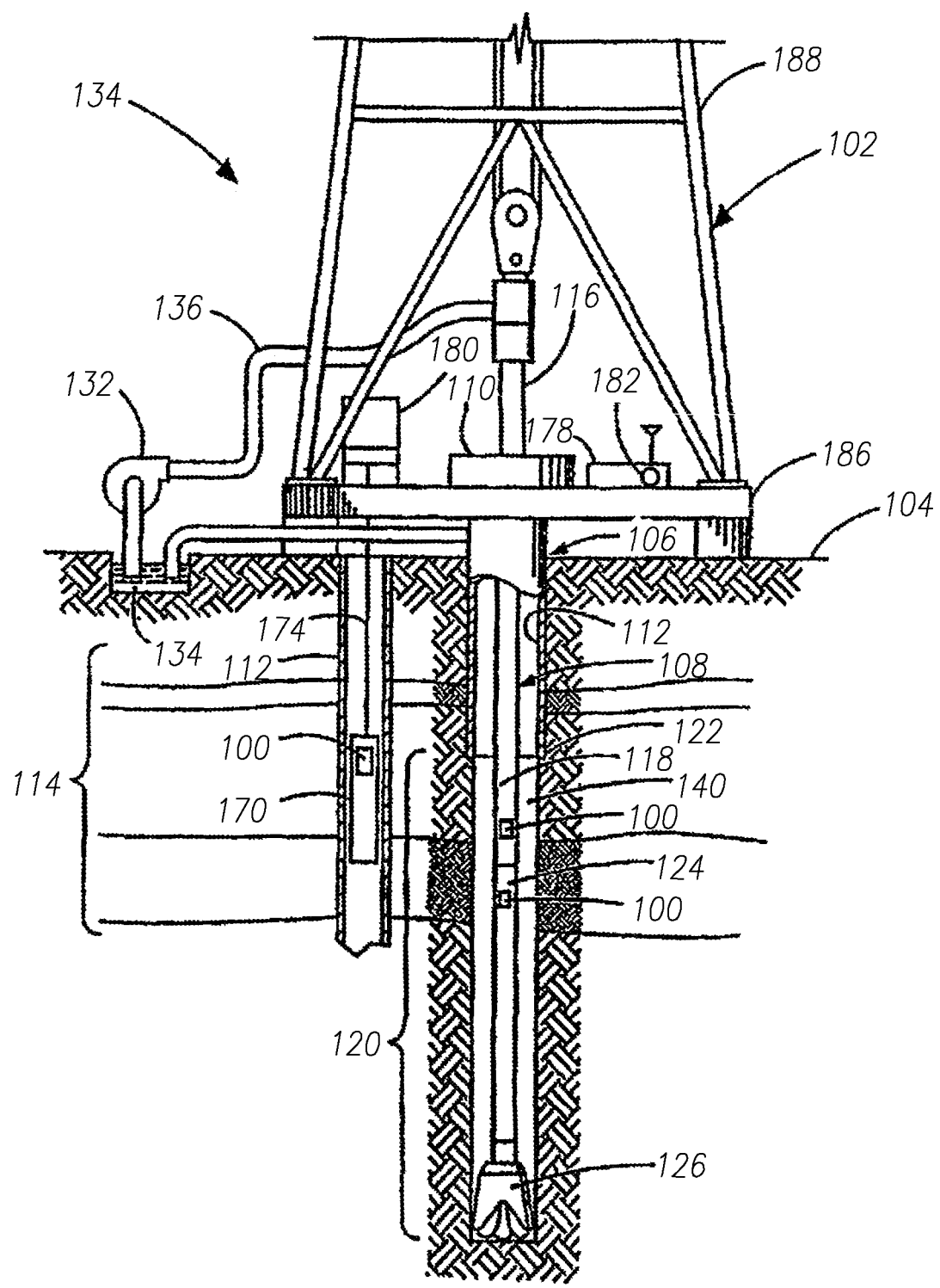
FIG. 1A illustrates a drilling well during wireline logging operations, according to some embodiments.

FIG. 1A illustrates a drilling well during Measurement While Drilling (MWD) operations, Logging While Drilling (LWD) operations or Surface Data Logging (SDL) operations, according to some embodiments. It can be seen how a system 164 may also form a portion of a drilling rig 102 located at a surface 104 of a well 106. The drilling rig 102 may provide support for a drill string 108. The drill string 108 may operate to penetrate a rotary table 110 for drilling a borehole 112 through subsurface formations 114. The drill string 108 may include a Kelly 116, drill pipe 118, and a bottom hole assembly 120, perhaps located at the lower portion of the drill pipe 118.

The bottom hole assembly 120 may include drill collars 122, a downhole tool 124, and a drill bit 126. The drill bit 126 may operate to create a borehole 112 by penetrating the surface 104 and subsurface formations 114. The downhole tool 124 may comprise any of a number of different types of tools including MWD (measurement while drilling) tools, LWD (logging while drilling) tools, and others.

During drilling operations, the drill string 108 (perhaps including the Kelly 116, the drill pipe 118, and the bottom hole assembly 120) may be rotated by the rotary table 110. In addition to, or alternatively, the bottom hole assembly 120 may also be rotated by a motor (e.g., a mud motor) that is located downhole. The drill collars 122 may be used to add weight to the drill bit 126. The drill collars 122 also may stiffen the bottom hole assembly 120 to allow the bottom hole assembly 120 to transfer the added weight to the drill bit 126, and in turn, assist the drill bit 126 in penetrating the surface 104 and subsurface formations 114.

During drilling operations, a mud pump 132 may pump drilling fluid (sometimes known by those of skill in the art as "drilling mud") from a mud pit 134 through a hose 136 into the drill pipe 118 and down to the drill bit 126. The drilling fluid can flow out from the drill bit 126 and be returned to the surface 104 through an annular area 140 between the drill pipe 118 and the sides of the borehole 112. The drilling fluid may then be returned to the mud pit 134, where such fluid is filtered. In some embodiments, the drilling fluid can be used to cool the drill bit 126, as well as to provide lubrication for the drill bit 126 during drilling operations. Additionally, the drilling fluid may be used to remove subsurface formation 114 cuttings created by operating the drill bit 126.

Figure 1B:
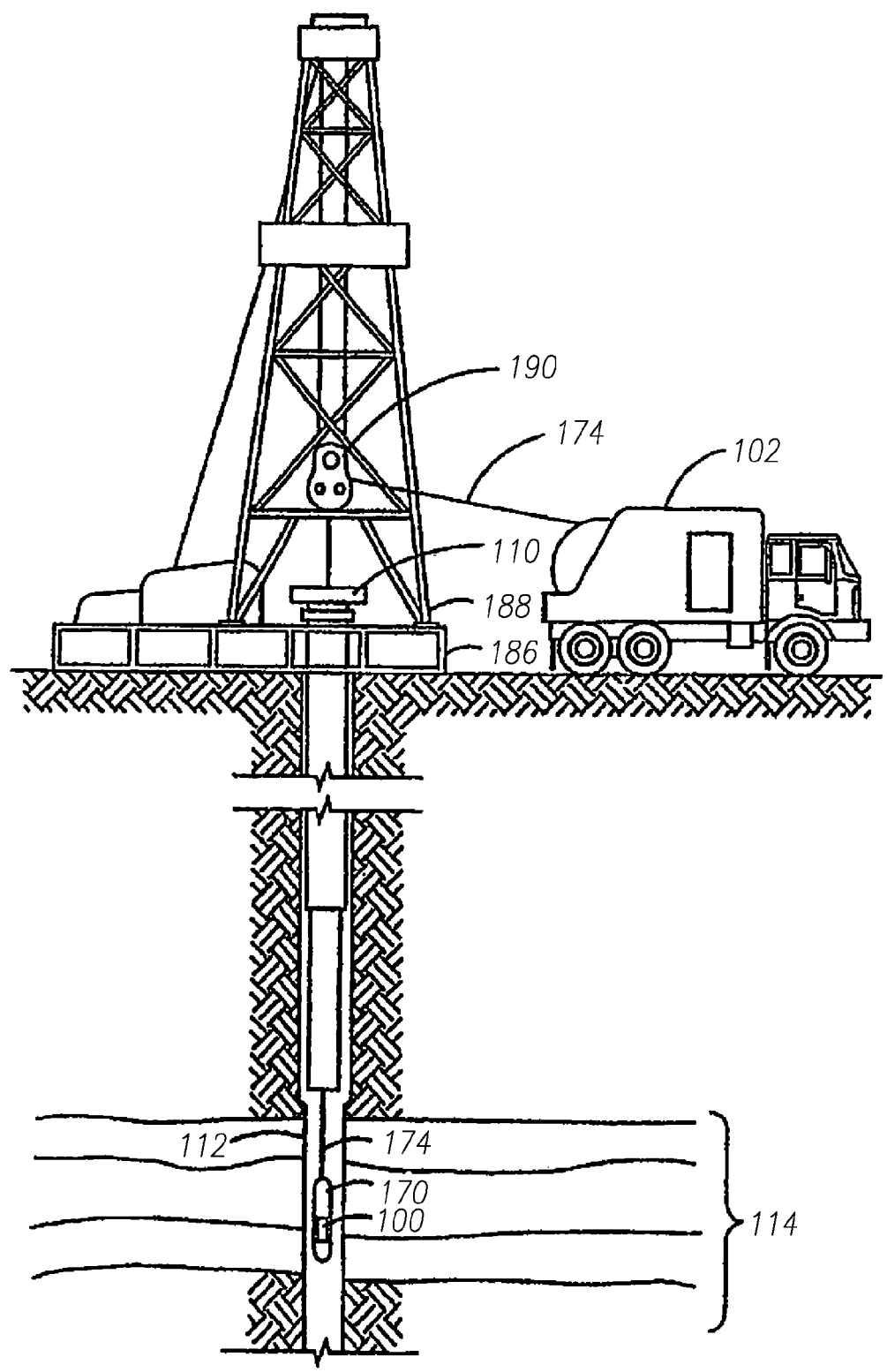
FIG. 1B illustrates a drilling well during Measurement While Drilling (MWD) operations, Logging While Drilling (LWD) operations or Surface Data Logging (SDL) operations, according to some embodiments.

FIG. 1B illustrates a drilling well during wireline logging operations, according to some embodiments. A drilling platform 186 is equipped with a derrick 188 that supports a hoist 190. Drilling of oil and gas wells is commonly carried out by a string of drill pipes connected together so as to form a drilling string that is lowered through a rotary table 110 into a wellbore or borehole 112. Here it is assumed that the drilling string has been temporarily removed from the borehole 112 to allow a wireline logging tool body 170, such as a probe or sonde, to be lowered by wireline or logging cable 174 into the borehole 112. Typically, the tool body 170 is lowered to the bottom of the region of interest and subsequently pulled upward at a substantially constant speed. During the upward trip, instruments included in the tool body 170 may be used to perform measurements on the subsurface formations 114 adjacent the borehole 112 as they pass by. The measurement data can be communicated to a logging facility 192 for storage, processing, and analysis. The logging facility 192 may be provided with electronic equipment for various types of signal processing. Similar log data may be gathered and analyzed during drilling operations (e.g., during Logging While Drilling, or LWD operations).

Configurations for Controlling Operations of a Radiation Source

Figure 2:
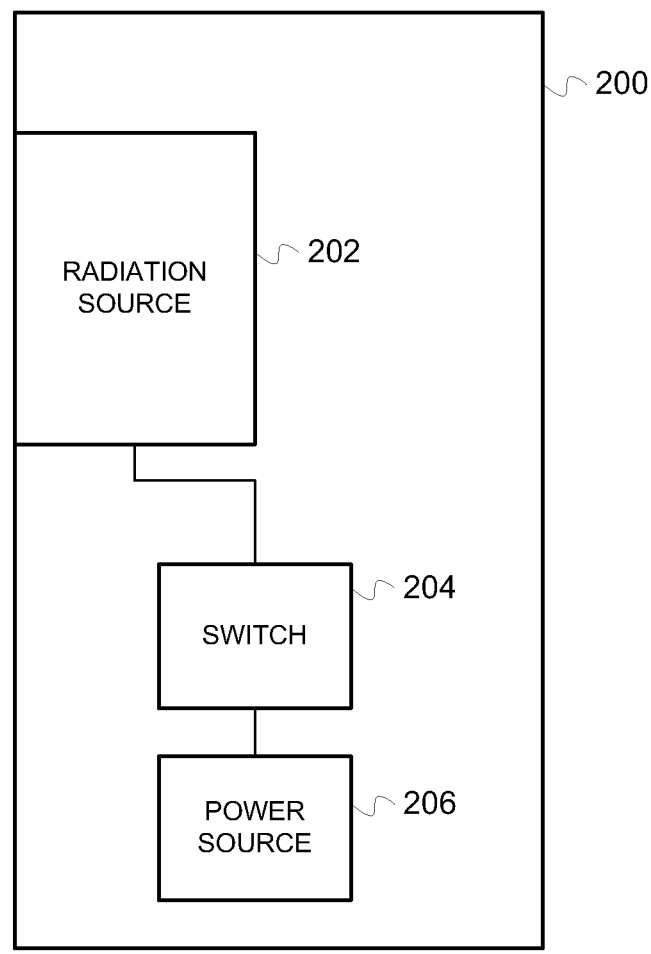
FIG. 2 illustrates part of a bottomhole assembly/tool body having a measurement assembly that includes a radiation source, according to some embodiments.

FIG. 2 illustrates part of a bottomhole assembly/tool body having a measurement assembly that includes a radiation source, according to some embodiments. FIG. 2 is described such that the measurement assembly is part of the bottomhole assembly 120 (shown in FIG. 1B). However, some embodiments may be incorporated into the tool body 170 illustrated in FIG. 1A.

The bottomhole assembly 220 includes a radiation source 202 that is electrically coupled to an ambient-activated switch 204. The switch 204 may be activated based on one or more ambient characteristics. For example, the switch 204 may activate based on temperature, pressure, light, etc. Accordingly, the switch 204 may be one or a combination of a thermal switch, a pressure switch, an optical switch, etc. The switch 204 is electrically coupled to a power source 206. The radiation source 202 may be a pulsed neutron generator, an x-ray generator, etc. The power source 206 may be representative of a battery, a fuel cell, a flow-driven generator, etc. In some embodiments, the power source 206 is not part of the bottomhole assembly 220. For example the power source 206 may be at the surface, while the radiation source 202 and the switch 204 are in the bottomhole assembly 220.

In some embodiments, the radiation source, the switch and the power source may be in one or more downhole tools of the bottomhole assembly. For example, the switch may be positioned in the downhole tool that includes the radiation source (e.g., the electronics of a pulsed neutron downhole tool). The switch may also be in the power supply section of the radiation source. In some embodiments, the switch may be in a standalone sub located anywhere downhole. The switch may also be incorporated into a battery pack or between a battery pack and the instrumentation section of a measuring device (such as a pulsed neutron tool).

The switch 204 may be different types of thermal switches that switch between an open and a closed position depending on the ambient characteristics. For example, the switch 204 may switch to a closed position to allow for current flow after a temperature, pressure, measure of light is reached. In some embodiments, the switch 204 is configured to change to a closed position (to supply power to the radiation source 202) if predetermined functional ambient characteristic is higher than a level for the ambient characteristic at the surface of the Earth but lower than the level at the depth of needed function. For example, the switch 204 may be configured to allow for a current flow after the ambient temperature is around or above a downhole temperature. Otherwise, the thermal switch 204 may remain in an open position. The switch 204 may remained in an open position while an ambient temperature is around a surface temperature. Examples of thermal switches include Honeywell 500 Series thermal switches, the Honeywell 250 Series thermal switches, Honeywell 100 Series thermal switches, Honeywell 700 Series thermal switches, Honeywell 270 Series thermal switches, Control Products, Inc. (CPI®) SnapStat, Snap-Action thermal switches, Control Products, Inc. (CPI®) PlugStat Bimetallic Strip thermal switches, Control Products, Inc. (CPI®) Rod and Tube thermal switches, etc. Accordingly, the switch 204 may remain in a position not to supply power while the ambient temperature is at or around a surface temperature. The switch 204 may switch to a position to supply power from the power source 206 to the radiation source 202 after a downhole temperature is reached. While FIG. 2 illustrates one switch, more than one switch may be used to control the power to the radiation source 202.

In some embodiments, the switch 204 is configured to be in an open position and not supply the power to the radiation source 202 while the ambient temperature is at or around a surface temperature. For example, the switch 204 may be in an open position in a range of less than about 120 degrees Fahrenheit, a range of less than about 135 degrees Fahrenheit, a range of less than about 150 degrees Fahrenheit, a range of about −50 to 150 degrees Fahrenheit, a range of less than about 150 degrees Fahrenheit, a range of less than about 120 degrees Fahrenheit, a range of less than 200 degrees Fahrenheit, a range of −40 to 1500 degrees Fahrenheit, etc. In some embodiments, the switch 204 is configured to be in a closed position and to supply power to the radiation source 202 while the ambient temperature is at or around a downhole temperature. For example, the switch 204 may be in a closed position in a range of greater than about 120 degrees Fahrenheit, a range of greater than about 135 degrees Fahrenheit, a range of greater than about 150 degrees Fahrenheit, a range of about 150 to 500 degrees Fahrenheit, a range of greater than about 200 degrees Fahrenheit, a range of greater than about 175 degrees Fahrenheit, a range of about 150 to 375 degrees Fahrenheit, etc. In some embodiments, the thermal switches change positions at a temperature from about 150 degrees Fahrenheit to about 165 degrees Fahrenheit, from about 150 degrees Fahrenheit to about 155 degrees Fahrenheit, from about 155 degrees Fahrenheit to about 170 degrees Fahrenheit, 150, from about 165 degrees Fahrenheit to about 175 degrees Fahrenheit, from about −70 degrees Fahrenheit to about 500 degrees Fahrenheit, etc. In some embodiments, the switch 204 is configured to be in a closed position and to supply power to the radiation source 202 while X degrees Fahrenheit above a given temperature threshold. For example, X may be 30 degrees Fahrenheit and the given temperature threshold is 95 degrees Fahrenheit; X may be 20 degrees Fahrenheit and the given temperature threshold is 100 degrees Fahrenheit; X may be 50 degrees Fahrenheit and the given temperature threshold is 100 degrees Fahrenheit, etc.

In some embodiments, the downhole temperature may be lower than the surface temperature. Accordingly, the switch 204 is configured to be in a closed position and supply the power to the radiation source 202 if the downhole temperature is below a given threshold. For example, the switch 204 may be in an open position in a range of greater than about 70 degrees Fahrenheit, a range of greater than about 50 degrees Fahrenheit, a range of greater than about 90 degrees Fahrenheit, a range of about −50 to 150 degrees Fahrenheit, a range of less than about 150 degrees Fahrenheit, a range of −40 to 1500 degrees Fahrenheit, etc. The switch 204 may be in a closed position (to supply power) in a range of less than about 70 degrees Fahrenheit, a range of less than about 50 degrees Fahrenheit, a range of greater than about 90 degrees Fahrenheit, a range of about 150 to 500 degrees Fahrenheit, a range of less than about 100 degrees Fahrenheit, a range of less than about 25 degrees Fahrenheit, a range of about 150 to 375 degrees Fahrenheit, etc. In some embodiments, the switch 204 is configured to change to a closed position (to supply power to the radiation source 202) if predetermined functional temperature is lower than the surface ambient temperature but higher than the temperature at the depth of needed function.

In some embodiments, the switch 204 comprises a pressure switch. The pressure switch may remain in a position not to supply power while the ambient pressure is at or around a pressure at the Earth's surface. The pressure switch may switch to a position to supply power from the power source 206 to the radiation source 202 after a downhole pressure is reached. For example, the pressure switch may be in an open position in a range of less than about 101 kiloPascals (kPa), a range of less than about 100 kPa, a range of about 90 to 110 kPa, a range of less than about 120 kPa, a range of less than about 150 kPa, etc. The pressure switch may be in a closed position in a range of greater than about 110 kPa, a range of greater than about 120 kPa, a range of greater than about 130 kPa, a range of greater than about 140 kPa, a range of greater than about 150 kPa, a range of greater than about 200 kPa, etc.

In some embodiments, the switch 204 comprises an optical switch. The optical switch may remain in a position not to supply power while the ambient light is at or around a level of light at the Earth's surface. The optical switch may switch to a position to supply power from the power source 206 to the radiation source 202 after the ambient light level drops below a certain threshold. For example, the optical switch may be in an open position in a range of greater than 0 candela per square meters ($cd/m^2$), greater than $1.0\ cd/m^2$, greater than 5 $cd/m^2$, etc. The optical switch may be in a closed position in a range of less than about $0\ cd/m^2$, less than about $0.5\ cd/m^2$, less than about $-0.5\ cd/m^2$, less than about $-1.0\ cd/m^2$, less than about $-10.0\ cd/m^2$, etc.

In some embodiments, the switch 204 comprises a vibratory switch. For example, the vibratory switch may comprise any type of vibratory sensor (such as a gyroscope, an accelerometer, etc.). The vibratory switch may switch to a position to supply power from the power source 206 to the radiation source 202 after the vibration level exceeds a certain threshold. For example, the vibratory switch may be in an open position in a range of vibration of more than about 0.1 Gs, more than about 1 Gs, more than about 5 Gs, more than about 10 Gs, more than about 50 Gs, more than about 100 Gs, etc.

The switch 204 may be positioned in any location in an electrical configuration to regulate the supply of power from the power source 206 to the radiation source 202. FIGS. 3-7 illustrate example configurations.

Figure 3:
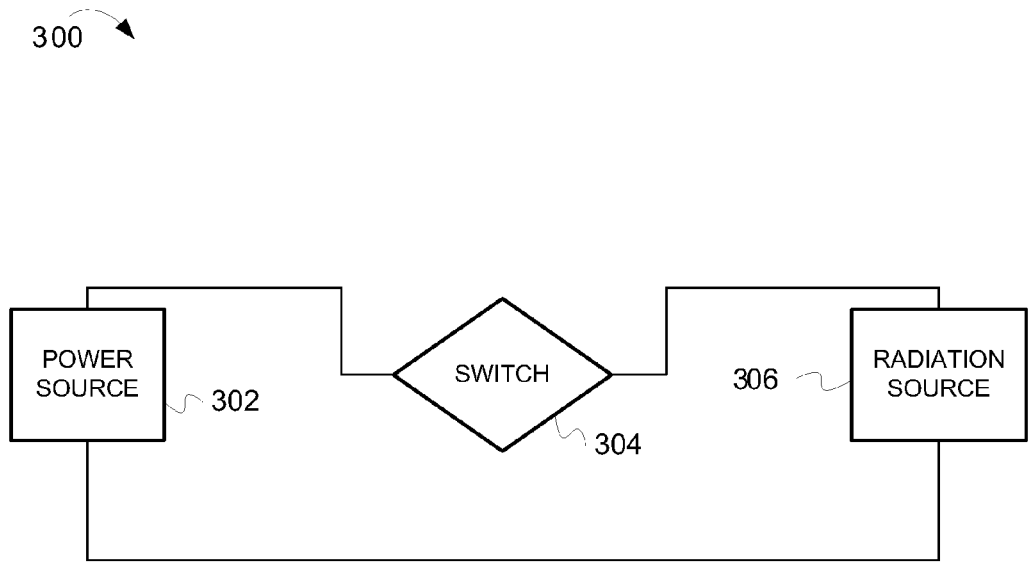
FIG. 3 illustrates a configuration of an ambient-activated switch to control power to a radiation source downhole, according to some embodiments.

FIG. 3 illustrates a configuration of an ambient-activated switch to control power to a radiation source downhole, according to some embodiments. A circuit 300 comprises a power source 302, a switch 304 and a radiation source 306. The power source 302 is coupled in series with the switch 304, which is in series with the radiation source 306. While a value for an ambient characteristic (such as temperature, pressure, light, vibration, etc.) of the switch 304 is at an ambient level for the surface of the Earth, the switch 304 is configured to be in an open position (see ranges described above). Accordingly, current does not flow from the power source 302 to the radiation source 306. After the value for the ambient characteristic of the switch 304 reaches a given downhole ambient level, the switch 304 changes to a closed position (see ranges described above). Therefore, current from the power source 302 is supplied to the radiation source 306. Thus, the radiation source 306 does not become operational until a value for a given ambient characteristic has reached a downhole ambient level.

Figure 4:
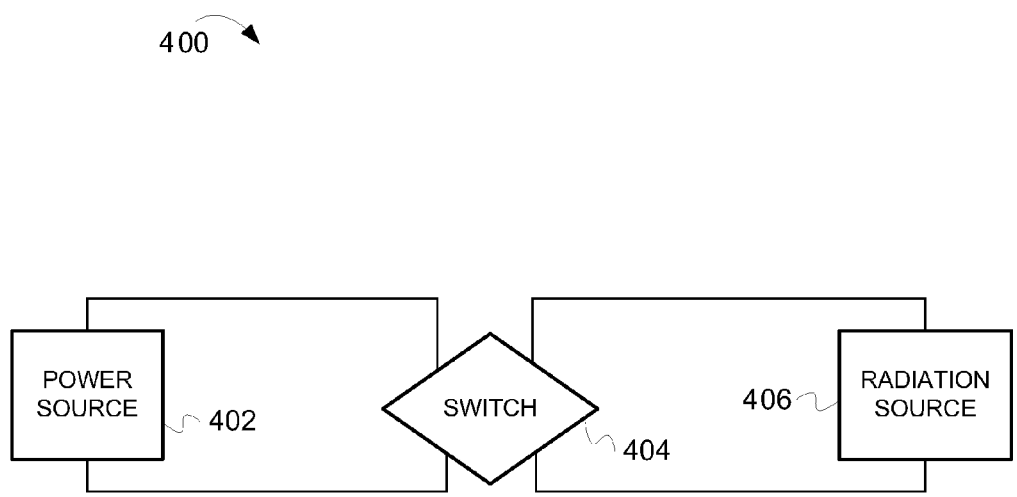
FIG. 4 illustrates a configuration of an ambient-activated switch to control power to a radiation source downhole, according to some other embodiments.

FIG. 4 illustrates a configuration of an ambient-activated switch to control power to a radiation source downhole, according to some other embodiments. A circuit 400 comprises a power source 402, a switch 404 and a radiation source 406. The circuit 400 is configured in a shunt configuration. The switch 404 is coupled in parallel between the power source 402 and the radiation source 406. While a value for an ambient characteristic for the switch 404 is at an ambient level for the surface of the Earth, the switch 404 is closed thereby providing a shunt such that current does not flow to the radiation source 406. After the value for the ambient characteristic of the switch 404 reaches a given downhole ambient level, the switch 404 switches to an open position. Therefore, current from the power source 402 is supplied to the radiation source 406. Thus, the radiation source 406 does not become operational until a vale for a given ambient characteristic has reached a downhole ambient level.

Figure 5:
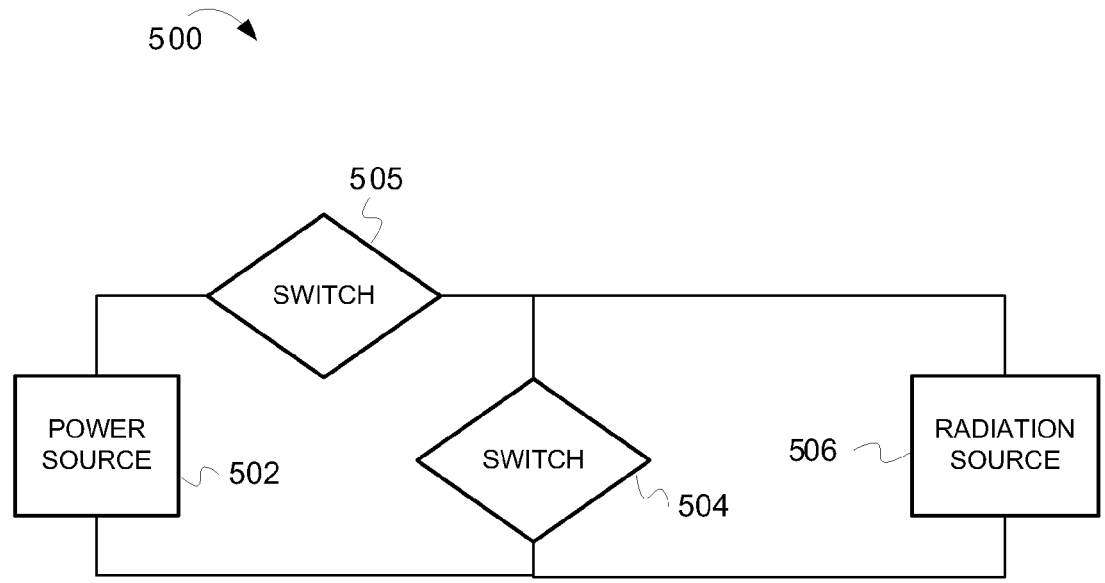
FIG. 5 illustrates a configuration of an ambient-activated switch to control power to a radiation source downhole, according to some other embodiments.

FIG. 5 illustrates a configuration of an ambient-activated switch to control power to a radiation source downhole, according to some other embodiments. A circuit 500 comprises a power source 502, a switch 504, a switch 505 and a radiation source 506. The power source 502 is coupled in series with the switch 505, which is in series with the radiation source 506. The circuit 500 is also configured in a shunt configuration. The switch 504 is coupled in parallel between the power source 502 and the radiation source 506.

While a value for an ambient characteristic of the switch 505 is at an ambient level for the surface of the Earth, the switch 505 is configured to be in an open position. Accordingly, current does not flow from the power source 502 to the radiation source 506. After the value for the ambient characteristic of the switch 505 reaches a given downhole ambient level, the switch 505 changes to a closed position. While a value for the ambient characteristic of the switch 504 is at an ambient level for the surface of the Earth, the switch 504 is closed thereby providing a shunt such that current does not flow to the radiation source 506. After the value for the ambient characteristic of the switch 505 reaches a given downhole ambient level, the switch 504 switches to an open position. Therefore, current from the power source 502 is supplied to the radiation source 506 until the switch 505 is in a closed position and the switch 504 is in an open position. Thus, multiple switches provide a redundancy to ensure that the radiation source is not supplied power until a downhole ambient levels are reached.

Figure 6:
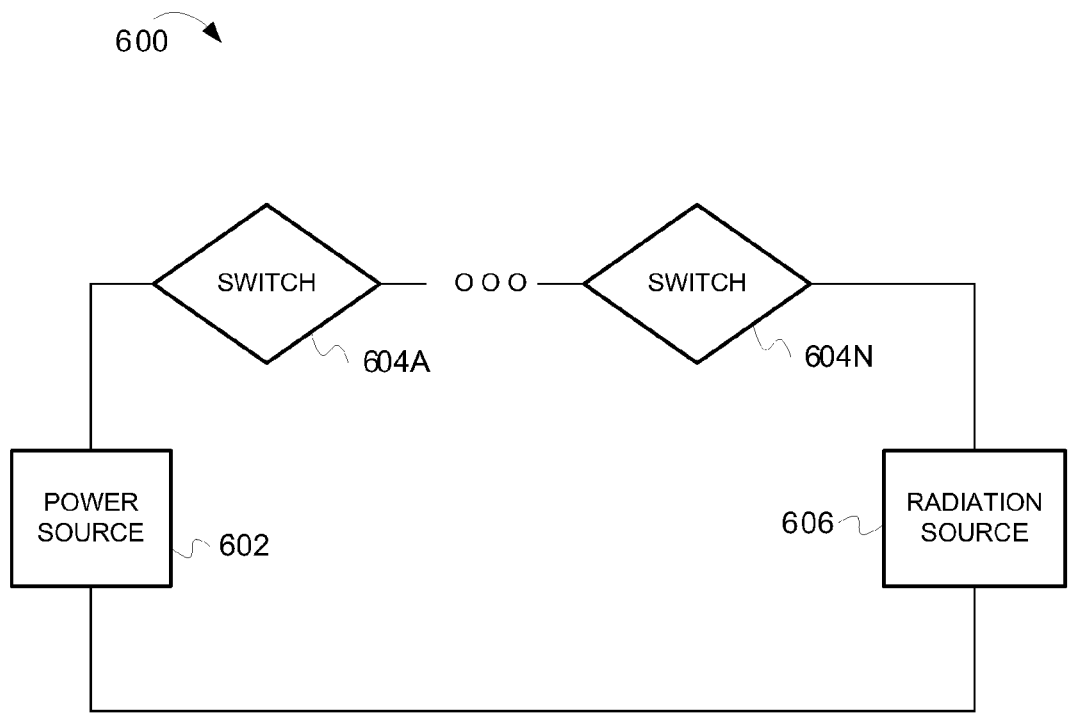
FIG. 6 illustrates a configuration of an ambient-activated switch to control power to a radiation source downhole, according to some embodiments.

FIG. 6 illustrates a configuration of an ambient-activated switch to control power to a radiation source downhole, according to some embodiments. In particular, a circuit 600 comprises multiple switches coupled in series between the power source and the radiation source. The circuit 600 comprises a power source 602, switches 604A-604N and a radiation source 606. The power source 602 is coupled in series with the switches 604A-604N, which are in series with the radiation source 606. While a value for an ambient characteristic of the switches 604 is at an ambient level for the surface of the Earth, the switches 604 are configured to be in an open position. Accordingly, current does not flow from the power source 602 to the radiation source 606. After the value for the ambient characteristic reaches a given downhole ambient level, the switches 604 change to a closed position. Therefore, current from the power source 602 is supplied to the radiation source 606. Thus, the radiation source 606 does not become operational until a given downhole ambient level is reached. As described, any number and type of switches 604 may be connected in series to ensure that current is not supplied to the radiation source 608 until a given downhole ambient level is reached.

Figure 7:
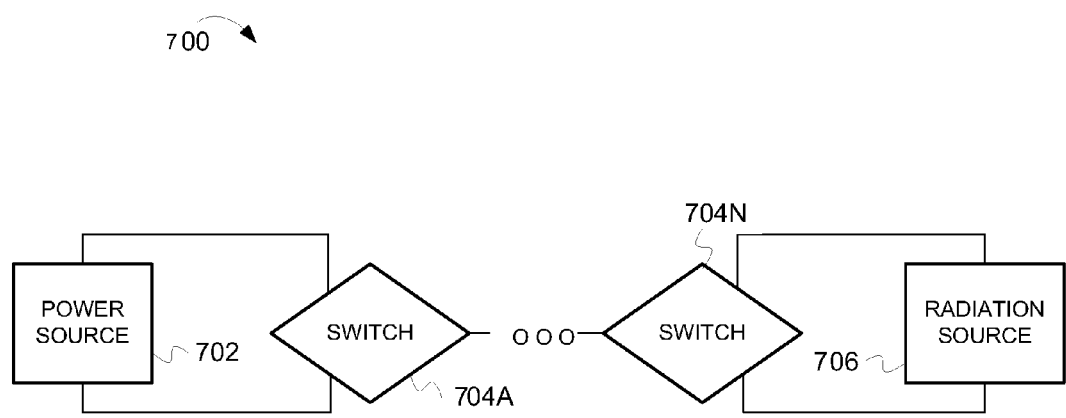
FIG. 7 illustrates a configuration of an ambient-activated switch to control power to a radiation source downhole, according to some other embodiments.

FIG. 7 illustrates a configuration of an ambient-activated switch to control power to a radiation source downhole, according to some other embodiments. In particular, a circuit 700 comprises multiple switches coupled in a shunt configuration between the power source and the radiation source. The circuit 700 comprises a power source 702, switches 704A-704N and a radiation source 706. The circuit 700 is configured in a shunt configuration. The switches 704 are coupled in parallel between the power source 702 and the radiation source 706. While a value for an ambient characteristic is at an ambient level for the surface of the Earth, the switches 704 are closed thereby providing a shunt such that current does not flow to the radiation source 706. After the value for the ambient characteristic reaches a given downhole ambient level, the switches 704 switches to an open position. Therefore, current from the power source 702 is supplied to the radiation source 706. Thus, the radiation source 706 does not become operational until a given downhole ambient level is reached. As described, any number and type of switches 704 may be connected in parallel to ensure that current is not supplied to the radiation source 708 until a given downhole ambient level is reached.

FIGS. 3-7 illustrates a number of example configurations. One to any number of ambient-activated switches may be positioned between the power source and the radiation source to ensure that current is only supplied to the radiation source after a given ambient characteristic is reached a given threshold. An additional example may include the combination of the configurations shown in FIGS. 6-7. Specifically, multiple switches may be coupled in series and multiple switches may be coupled in parallel between the power source and the radiation source.

General

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. An apparatus comprising:
a neutron radiation source to output neutron radiation after power is supplied;
a power source to supply the power; and
an ambient-activated optical switch electrically coupled between the neutron radiation source and the power source, the ambient-activated optical switch being configured to switch to a decoupling condition while ambient light at the ambient-activated optical switch is at an ambient level for a surface of the Earth, the neutron radiation source being electrically decoupled from the power source while the ambient-activated optical switch is in the decoupling condition, the ambient-activated optical switch being configured to switch to a coupling condition while the ambient light at the ambient-activated optical switch is at or below a threshold level, wherein the ambient-activated optical switch is configured to electrically couple the power source to the neutron radiation source while in the coupling condition.

2. The apparatus of claim 1, wherein the neutron radiation source is a pulsed neutron tool.

3. The apparatus of claim 1, wherein the ambient-activated optical switch is electrically coupled in series between the neutron radiation source and the power source, switching of the ambient-activated optical switch to the coupling condition comprising switching thereof to a closed position.

4. The apparatus of claim 1, wherein the ambient-activated optical switch is electrically coupled in a shunt configuration between the neutron radiation source and the power source, switching of the ambient-activated optical switch to the coupling position comprising switching thereof to an open position.

5. The apparatus of claim 1, wherein the power source comprises a downhole power supply.

6. The apparatus of claim 1, wherein the neutron radiation source is to output neutron radiation during a Measurement While Drilling Operation.

7. The apparatus of claim 1, further comprising a different ambient-activated switch electrically coupled between the neutron radiation source and the power source, the different ambient-activated switch to switch to a decoupling condition while a value for an ambient characteristic for the different ambient-activated switch is at an ambient level at a surface of the Earth, the different ambient-activated switch is to switch to a coupling condition while the value for the ambient characteristic for the different ambient-activated switch is at a downhole ambient level, wherein the different ambient-activated switch is to electrically couple the power source to the neutron radiation source while in the coupling condition.

8. The apparatus of claim 7, wherein the ambient-activated switch and the different ambient-activated switch are electrically coupled in a shunt configuration between the neutron radiation source and the power source.

9. The apparatus of claim 7, wherein the different ambient-activated switch comprises a pressure switch that is to switch to the decoupling condition while the ambient pressure for the pressure switch is at pressure for the surface of the Earth, the pressure switch to switch to the coupling condition while the ambient pressure for the pressure switch is at a downhole level.

10. The apparatus of claim 7, wherein the different ambient-activated switch comprises a switch selected from a group consisting of a thermal switch and a vibratory switch.

11. The apparatus of claim 1, wherein the threshold level is about 0 candela per square meter ($cd/m^2$).

12. The apparatus of claim 1, wherein the threshold level is in the range of 0-1 $cd/m^2$.

13. The apparatus of claim 1, wherein the threshold level is in the range of 1-5 $cd/m^2$.

14. A system comprising:
a drill string having a drill bit, the drill string to extend through at least part of a well bore, wherein the drill string comprises:
a tool to emit neutrons for formation evaluation;
a power source to supply power; and
a switch electrically coupled between the tool and the power source, the switch being optically sensitive and being configured to switch to a condition in which it does not electrically couple the power source to the tool if a value of an ambient light level at the switch is at an ambient level at a surface of the Earth, the switch being configured to switch to a condition in which it electrically couples the power source to the tool if the value of the ambient light level of the switch is at or below a threshold level.

15. The system of claim 14, wherein the switch is electrically coupled in series between the tool and the power source.

16. The system of claim 14, wherein the power source comprises a battery.

17. The system of claim 14, wherein the switch further comprises a thermal switch that is to switch to not electrically couple the power source to the tool if an ambient temperature for the switch is at a temperature for the surface of the Earth, the thermal switch to switch to a closed position while the ambient temperature for the thermal switch is at a downhole temperature.

18. The system of claim 17, wherein the temperature for the surface of the Earth is in a range of less than about 150 degrees Fahrenheit.

19. The system of claim 17, wherein the downhole temperature is in a range of greater than about 200 degrees Fahrenheit.

20. The system of claim 14, wherein the switch further comprises a vibratory switch that is to switch to an open position while the ambient vibration for the vibratory switch is at a vibratory level for the surface of the Earth, the vibratory switch to switch to a closed position while the ambient vibration for the vibratory switch is at a downhole level.

21. The system of claim 14, wherein the switch, in addition to being optically sensitive, further comprises two or more switches selected from a group consisting of a thermal switch, a pressure switch, and a vibratory switch.

22. The system of claim 14, wherein the threshold level is in the range of 0-5 $cd/m^2$.

23. A method comprising:
electrically coupling a radiation source to an ambient-activated switch;
electrically coupling the ambient-activated switch to a power source, wherein the ambient-activated switch is in series or in a shunt configuration between the radiation source and the power source, the ambient-activated switch being configured to switch to a decoupling condition while an ambient light value of the ambient-activated switch is about an ambient level for a surface of the Earth, the radiation source being electrically disconnected from the power source while the ambient-activated switch is in the decoupling condition, the ambient-activated switch further being configured to switch to a coupling condition while the ambient light value of the ambient-activated switch is at or below a threshold level, the ambient-activated switch to electrically connect the power source to the radiation source while in the coupling condition;
lowering a tool that comprises the radiation source and the ambient-activated switch down the borehole, the power source not being electrically coupled to the neutron radiation source at or adjacent the surface of the Earth; and
upon reaching a depth at which an ambient light value sensed by the ambient-activated switch is at or below the threshold level, switching the ambient-activated switch to the coupling condition, to power the radiation source from the power source.

24. The method of claim 23, wherein the ambient-activated switch further comprises a thermal switch that is to switch to not electrically couple the power source to the radiation source if an ambient temperature for the switch is at a temperature for the surface of the Earth, the thermal switch to switch to electrically couple the power source to the radiation source while the ambient temperature for the thermal switch is at a downhole temperature.

25. The method of claim 24, wherein the temperature for the surface of the Earth is in a range of less than about 120 degrees Fahrenheit.

26. The method of claim 24, wherein the downhole temperature is in a range of about 150 to 375 degrees Fahrenheit.

27. The method of claim 23, wherein the ambient-activated switch further comprises a pressure switch that is to switch to a decoupling condition while ambient pressure for the pressure switch is at pressure for the surface of the Earth, the pressure switch to switch to a coupling condition while the ambient pressure for the pressure switch is at a downhole level.

28. The method of claim 23, wherein the ambient-activated switch further comprises a vibratory switch.

29. The method of claim 23, wherein the threshold level is in the range of 0-5 $cd/m^2$.

* * * * *